United States Patent [19]

Halm

[11] Patent Number: 5,644,178
[45] Date of Patent: Jul. 1, 1997

[54] WET ROTOR GAP TUBE MOTOR FOR PUMPS

[76] Inventor: Richard Halm, Silcherstrasse 54, D-73666 Baltmannsweiler, Germany

[21] Appl. No.: 431,843

[22] Filed: May 1, 1995

[30] Foreign Application Priority Data

May 4, 1994 [DE] Germany .................. 44 15 757.6
May 25, 1994 [DE] Germany .................. 44 18 166.3

[51] Int. Cl.$^6$ .................. H02K 1/22; H02K 11/00; H02K 5/10
[52] U.S. Cl. .................. 310/43; 310/87; 310/71
[58] Field of Search .................. 310/43, 87, 88, 310/89, 86, 71

[56] References Cited

U.S. PATENT DOCUMENTS

| | | | |
|---|---|---|---|
| 2,777,963 | 1/1957 | Kuntz | 310/86 |
| 2,944,297 | 7/1960 | Maynard | 18/59 |
| 3,555,319 | 1/1971 | Schaefer | 310/87 |
| 3,631,275 | 12/1971 | Conrad | 310/71 |
| 3,842,298 | 10/1974 | Schaefer | 310/87 |
| 4,387,313 | 6/1983 | Yamamoto et al. | 310/71 |
| 4,456,844 | 6/1984 | Yamamoto et al. | 310/87 |
| 4,549,105 | 10/1985 | Yamamoto et al. | 310/87 |
| 4,585,966 | 4/1986 | Nishida et al. | 310/87 |
| 4,626,721 | 12/1986 | Ouchi | 310/71 |

Primary Examiner—Steven L. Stephan
Assistant Examiner—Michael Wallace, Jr.
Attorney, Agent, or Firm—Roylance, Abrams, Berdo & Goodman, L.L.P.

[57] ABSTRACT

An apparatus for pumps, especially circulation pumps, has a stator including a winding cast in a housing by hardenable sealing compound or filler to form a composite body. On its B-side opposite the meter pump, the housing has an unblocking device, as well as connection-forming elements in a connection chamber. The connection chamber is closed by a cover, and receives the connecting lines of the stator winding. The connection chamber is connected to the B-side panel of the housing. The connecting lines of the stator winding are guided in an axial direction out of the composite body and into the connection chamber 20.

13 Claims, 4 Drawing Sheets

WET ROTOR GAP TUBE MOTOR FOR PUMPS

FIELD OF THE INVENTION

The present invention relates to an apparatus for pumps, especially for circulation pumps. More particularly, the present invention relates to a wet rotor gap tube motor for pumps.

BACKGROUND OF THE INVENTION

In conventional motor housings for pumps, the connection or terminal box is provided usually on the outside cover of the housing, and covers an insert in the form of a connecting part. The connecting part closes off a corresponding opening in the cover and is provided with passage openings to accommodate the connecting lines of the stator winding or an AMP electric terminal board producing the required switch connections. The sealing joint is a matter for concern because it causes difficulties in the passage openings for the connecting lines or the electric terminal board where leakage of the epoxy resin serving as sealing compound occurs, and in the insert in the form of the connecting part itself along its outside border. In addition, following the hardening of the sealing compound, the boss present in the center of the B-side, i.e., on the panel opposite the meter pump, must be removed, and a seat must be formed for the B-side bearing at that location.

SUMMARY OF THE INVENTION

Objects of the present invention are to provide an apparatus for a pump which can be manufactured without problems and is of lower cost than housing apparatuses for pump motors of the type presently used.

The foregoing objects are basically obtained by an apparatus for pumps, comprising a housing and a stator having a winding cast in the housing by a hardenable sealing compound to form a composite body. The composite body has coupling means on a first side thereof for attaching the composite body to a pump on the first side of the composite body, and has a second side opposite the first side. Unblocking means are provided on the second side of the composite body. A connection chamber is connected to a housing second end panel on the second side of the composite body to receive electrical connection elements connecting electrical lines to the winding. The electrical lines extend in an axial direction of the composite body into the connection chamber. A cover is attached to the composite body and closes the connection chamber on the second side.

In the connection chamber, the connecting lines of the stator winding are connected with the feed line conductors, and the required electrical elements, for example, a capacitor, are arranged. The connection chamber is attached to the B-side housing end panel of the connection member. The connecting lines are no longer radial, but are aligned axially outward. The separate connection boxes mounted in known motors of this type on the outside of the cover of the housing, the opening in the housing cover and the insert part closing this opening are deleted from the apparatus of the present invention. Sealing problems are also avoided, because no opening need be provided in the end panel on the B-side to be closed off with a plate. Also the sealing of the through passages raises no problems for the connecting lines, because such passages are provided in the same panel surface of the housing in which the casting and compensating openings are arranged.

In one preferred embodiment, the side walls of the connection chamber are formed by an extension of the outer wall of the housing which extends beyond the B-side end panel surface. The connection chamber is constructed in one integral piece with the housing so that the connection chamber reaches as far as and includes the cover which closes it. Such structure further reduces the cost of the motor, because the cost outlay required by the extension is considerably lower than the outlay for a connection box with a bracket or cantilever to be mounted on the outer surface of the housing.

Additionally, the manufacturing costs can be considerably reduced by at least one casting opening and at least one compensating opening being provided at some radial distance from a central opening of the B-side panel surface of the housing, in place of the central boss, which central boss must be processed after the hardening. The removal of the boss and the cutting and removal processing of the hardened sealing compound can be completely deleted. The casting opening and the compensating opening or openings can each open into one chamber. The limiting panel of that chamber projects out beyond the B-side end panel of the housing and is constructed in one integral piece with this end panel surface.

In one preferred embodiment, the passage openings for the connecting lines open into the B-side end panel of the housing in a channel open only to the connection chamber. A gasket body inserted into this channel will then suffice for the sealing.

A contact carrier can support contacts in the form of connecting clamps for producing the required switch connections, and can be constructed in one integral piece with the end panel on the B side of the housing. This structure provides additional cost savings. Holding elements can be constructed on the B-side end panel surface for structural elements to be held in the connection chamber. Such structural elements can be a capacitor and a switch or circuit. This arrangement likewise reduces cost.

In one preferred embodiment, the central opening of the B-side end panel of the housing is formed by a pipe constructed and located on the B-side panel surface to project into the connection chamber. A bearing support for the bearing of the motor shaft on the B-side is mounted in the pipe. Any treatment previously required for the hardened sealing compound to form a seat for the bearing support can be deleted. The bearing support engaged in the pipe is preferably provided as part of an unblocking device with a central threaded bore passing through it. A screw plug cap can be engaged in the central threaded bore.

A central supporting frame is preferably constructed on the cover of the connection chamber. The frame can overlap and engage the free end of the central pipe built onto the end panel surface, forming a seal on the B-side. The water which may be discharged during an unblocking generated in this manner is discharged to the outside and cannot get into the connection chamber.

In one preferred embodiment, the bearing support on the B-side is centered and mounted in a split or gap tube. With this bearing support, axial force can be exerted on the split tube. A split tube flange provided on the A-side can engage with a sealed contact on a packing on the A-side panel surface of the composite body. A split tube B-side flange can engage with a seal on the O-ring which is arranged at this location.

If the B-side bearing support is metal, one of its screws for supporting it against the B-side panel surface of the housing can serve as connection for the ground conductor.

3

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
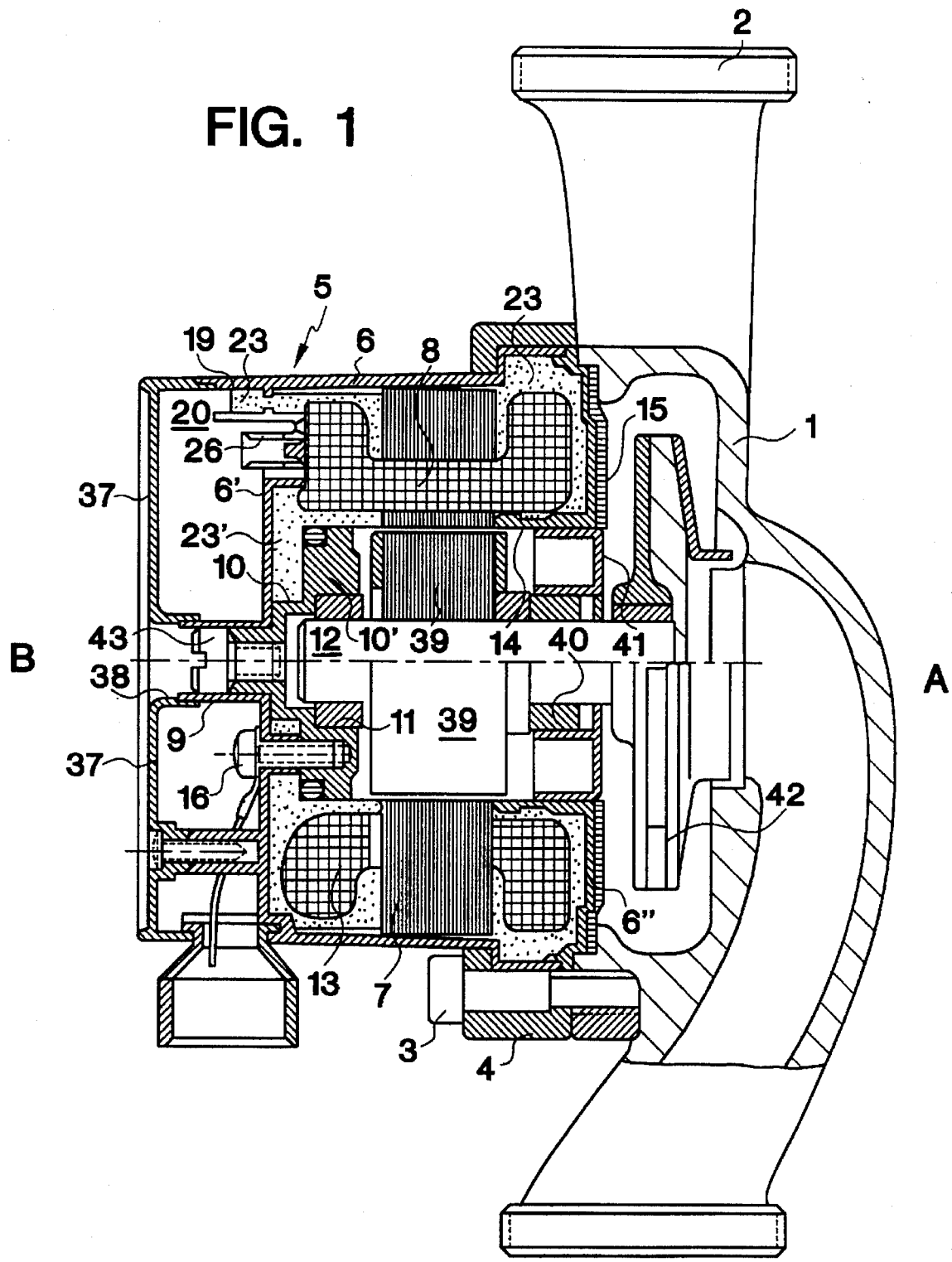
FIG. 1 is a side elevational view in section of an apparatus according to an embodiment of the present invention taken along line 1—1 of FIG. 2.

A circulation pump for use in a heating unit or hot water supply system, as shown in FIG. 1, has a pump housing 1 of traditional configuration. Housing 1 has two coaxially arranged short connection feed pipes 2. An electric motor 5 is connected to pump housing 1 by screws 3 and a flange member 4. The arrangement is configured as a wet rotor gap tube motor, which is embodied as a rotary current asynchronous motor with a capacitor auxiliary phase. The housing is a lost casting mold since it is used as a mold for resin 23, which housing cannot be re-used as a mold, in addition to the housing for the electric motor.

Electric motor 5 includes a casted or molded plastic housing 6. A stator bundle 7 of lamination plates is arranged in housing 6. The stator bundle supports a stator winding 8. The housing is closed off on the side (B-side or second side) opposite to and remote from pump housing 1 by an end panel surface 6' configured in one integral piece with an outer cover which is the cylindrical wall of motor housing 6. A cover part 6" closes the A-side of motor housing 6 and is turned toward pump housing 1. As shown in FIG. 1, cover part 6" covers an A-side winding head or end of the coil radially toward the interior with a central, tubular segment. An interior surface of cover part 6 connected smoothly and uniformly to the interior cover surface of stator bundle 7 of lamination plates.

The B-side end panel 6' of the housing mold is provided with a central opening receiving a coaxially arranged pipe 9. Pipe 9 projects outside end panel 6' on the end or side opposite pump housing 1. A central hollow journal of a B-side bearing support 10 is engaged in pipe 9. Bearing support 10 is made of metal.

Bearing support 10, as shown in FIG. 1, has one shoulder turned toward the inside of end panel 6', and has a flange part 10' arranged at some distance from end panel 6' along the pump axis. Flange part 10' is provided with an annular groove which opens radially outwardly and axially in the direction of end panel 6'. An O-ring 13 lies in this annular groove.

O-ring 13 is pressed against a B-side end of gap or split tube 14. A radially inwardly inclined flange is provided at

4 this end. The radial dimension of the split tube flange is smaller than that of the groove holding the O-ring. With the axial area of the outer surface of flange part 10' located adjacent to the annular groove, bearing support 10 is centered and mounted in split tube 14.

Split tube 14 lies on the inside surface of stator bundle 7 of lamination plates and of A-side cover part 6" of housing 6. A flange is provided on the A-side end of split tube 14. This flange is inclined radially outwardly, and is pressed against the inside edge zone of an annular-disk-shaped packing 15. Packing 15 engages the outside of cover part 6" of housing 6. As shown in FIG. 1, the outside edge zone of annular-disk-shaped packing 15 is inserted tightly between cover part 6" and a packing surface of pump housing 1. The tension force is produced by screws 3, which clamp flange member 4 against one shoulder of housing 6 and housing 6 tightly against pump housing 1.

The axial force exerted on split tube 14 is produced with the aid of two screws 16. Screws 16 pass through panel 6' on the B side, engage in threaded bores of flange part 10' of bearing support 10 on the B-side, and hold panel 6' and flange part 10' tightly against the surface of the material part 23' of a sealing compound formed of epoxy resin 23. Material part 23' engages panel 6' and extends into the interior of the motor. This tension force is transferred through O-ring 13 to the B-side flange of split tube 14 inclined radially inward.

Stator bundle 7 of lamination plates and stator winding 8 are cast by means of epoxy resin 23 in housing 6. As shown in FIG. 1, epoxy resin 23 fills the entire hollow space defined by housing 6, B-side bearing support bearing 10 and split tube 14. In this arrangement, the stator forms a composite body together with housing 6. The stator winding 8 is completely embedded in the filling and sealing compound formed by epoxy resin 23.

A casting opening 17 is provided at some radial distance, relative to the pump axis from the centrally arranged pipe 9 of B-side end panel 6'. It opens into a casting chamber 44, which is limited by two parallel walls 18 formed on end panel 6' and projecting from end panel 6'. These walls 18 are joined with an extension 19 of the outer cover of housing 6, which radially defines the outside limits of a connecting chamber 20 connected to end panel 6'. The axial length of extension 19 is somewhat greater than the axial length of walls 18.

Figure 2:
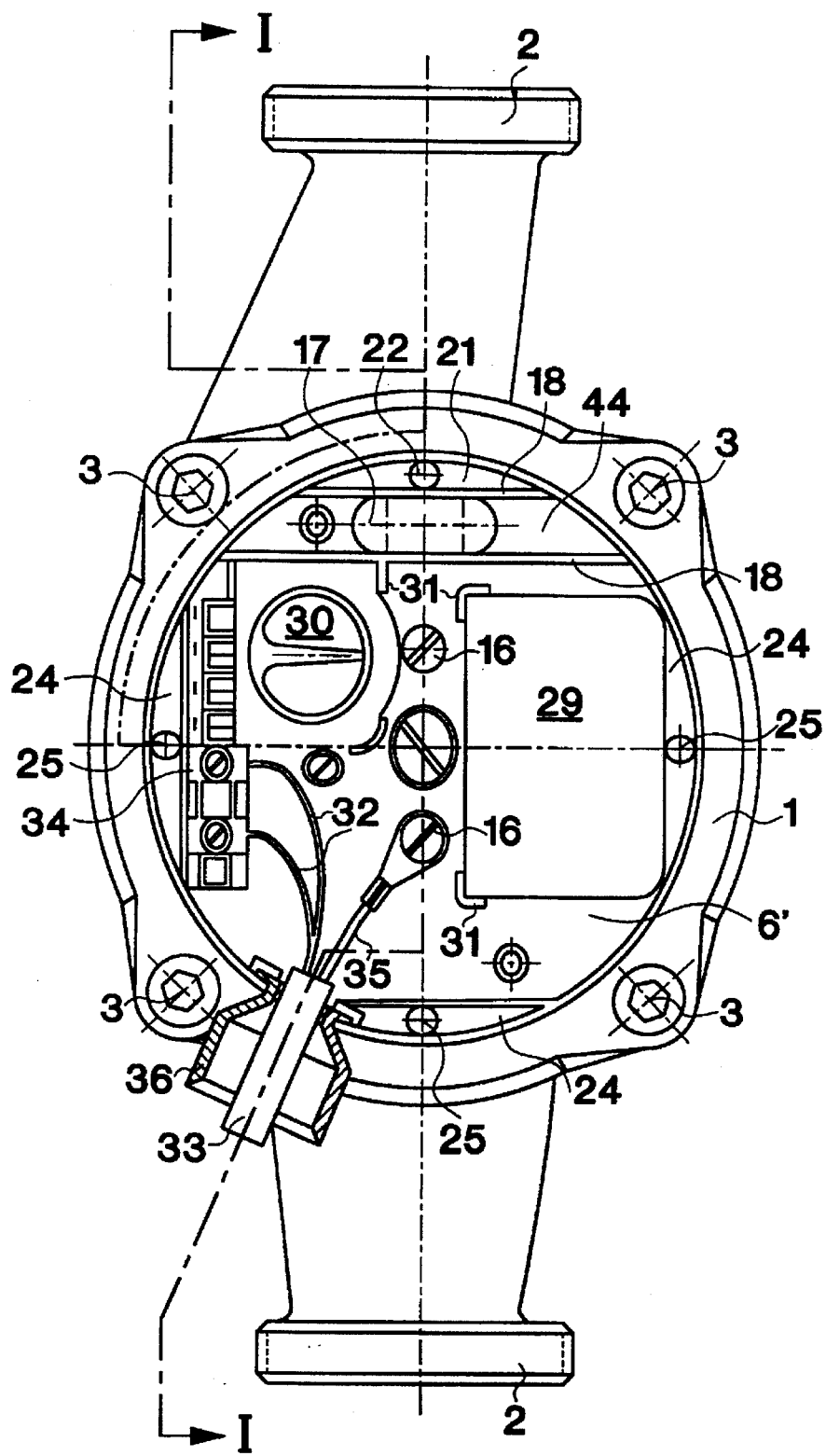
FIG. 2 is a side elevational view the B-side of the apparatus of FIG. 1, with the cover of the connection chamber removed.

The outer of the two walls 18 separates the casting chamber 44 from a compensating or equalizing chamber 21. Compensating chamber 21 is limited radially outwardly by extension 19, and opens into compensating opening 22 passing through panel 6'. The epoxy resin 23 serving as a filling and sealing compound is forced into compensating chamber 21. As shown in FIG. 1, the hollow spaces in the interior of housing 6 are totally filled upon termination of the casting. Three similarly configured compensating chambers 24, each with a compensating opening 25, are arranged offset by 90 degrees or 180 degrees around compensating chamber 21 and compensating opening 22, as shown in FIG. 2. The compensating chambers receive epoxy resin when the hollow spaces in housing 6 are filled.

Figure 4:
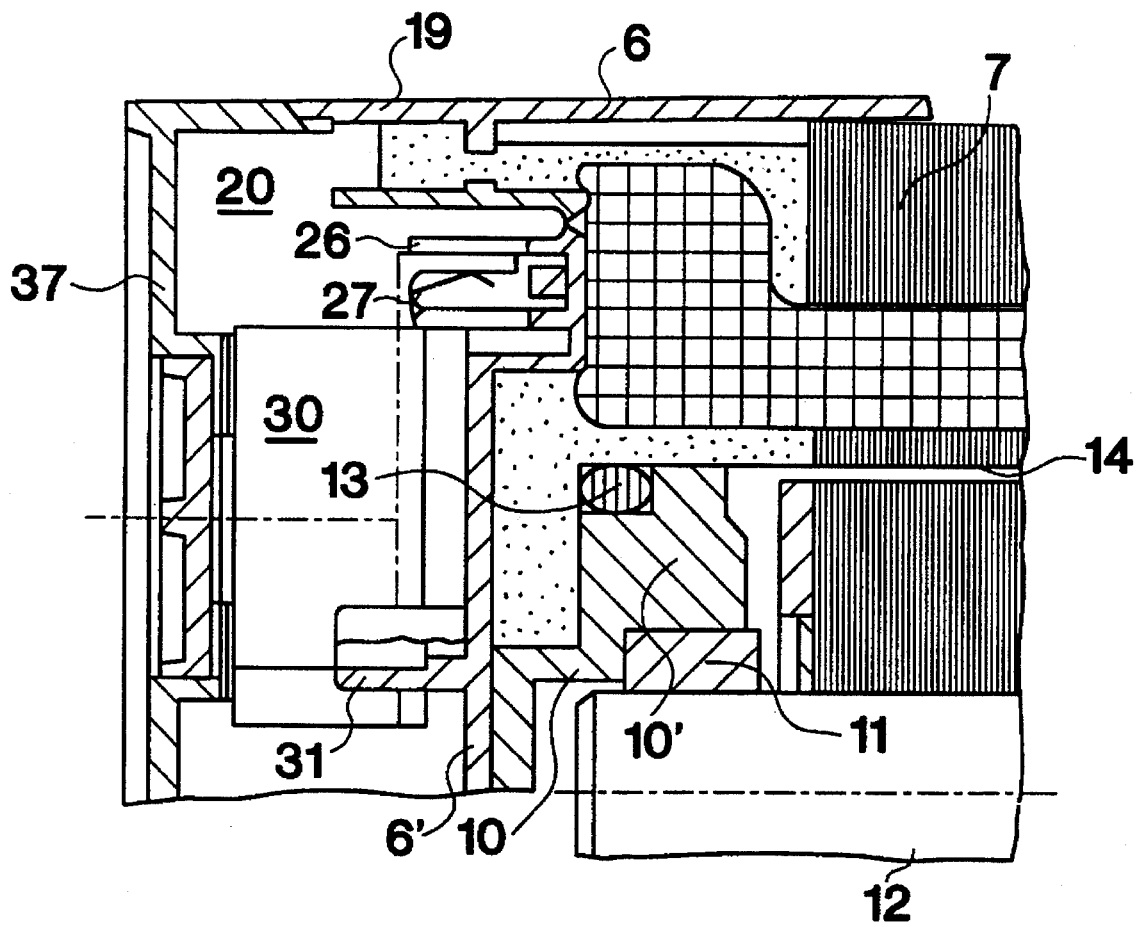
FIG. 4 is an enlarged side elevational view, in section, of a portion of FIG. 1 corresponding to that of FIG. 3, with inserted contact element and attached switch or circuit.

Located on the side of panel 6' of housing 6 and inclined into connection chamber 20, contact supports 26 are arranged in a series one after the other. Each contact support is covered with a contact member 27. As shown in FIG. 4, contact members 27 are configured such that the blank conductors to be contacted need only be plugged into them. Contact supports 26 and contact members 27 form an integrated connection or a contact strip of the type manufactured under the trademark AMP, by means of which the required switch connections can be produced between the connection lines 28 of stator winding 8 and a capacitor 29 and a switch or circuit 30.

Capacitor 29 and switch circuit 30 are arranged and mounted in connection chamber 20, and are held securely by holder elements 31 constructed on end panel 6'. For the connection of the two wire strands 32 of the power supply cable 33, the exemplary embodiment provides two screw clamps or screw terminals 34 in an extension of the AMP contact strip. However, wire strands 32 can also be connected with the two clamps found in the AMP contact strip itself. The wire strand 35 connecting the ground potential is electrically conductively connected with bearing support 10 by means of a cable eye or socket and one of the two screws 16.

For the introduction of the power supply from cable 33 into the connection chamber 20, extension 19 is provided in the connection chamber bottom segment with a U-shaped opening. A duct or lead-through bushing 36 is inserted in the U-shaped opening.

As shown in FIG. 1, connection chamber 20 is closed by a cover 37 mounted with its cylindrical border zone on the exposed border of extension 19. Cover 37 is provided with a central opening defined by a bushing 38 constructed on cover 37 and projecting into connection chamber 20. Bushing 38 overlaps pipe 9 in a sealed manner.

The motor shaft 12 supports a rotor 39, configured as a short-circuited rotor, and is mounted in a bearing 40 on the A-side. Bearing 40 is supported by a bearing support 41 pressed into the split tube 14. A pump impeller 42 is securely mounted on the end segment of motor shaft 12 overlapping bearing support 41 and projects into pump housing 1. Bearing support 41 supports bearing 40 for the motor shaft end segment on the A-side.

To unblock rotor 39 to rotate the motor shaft, the extension of bearing support 10, engaged in pipe 9, is provided with a central threaded bore passing through the extension. The threaded bore is normally closed by a threaded blanking plug 43. If blocking of rotor 39 must be eliminated, threaded blanking plug 43 is rotated out of the threaded bore and removed through the bore in bushing 38 of cover 37. A screwdriver device can then be driven into a depression in the front of motor shaft 12.

If water is discharged through the threaded bore, this water cannot get into connection chamber 20. Any water is carried away into the environment through pipe 9 and through bushing 38.

Figure 3:
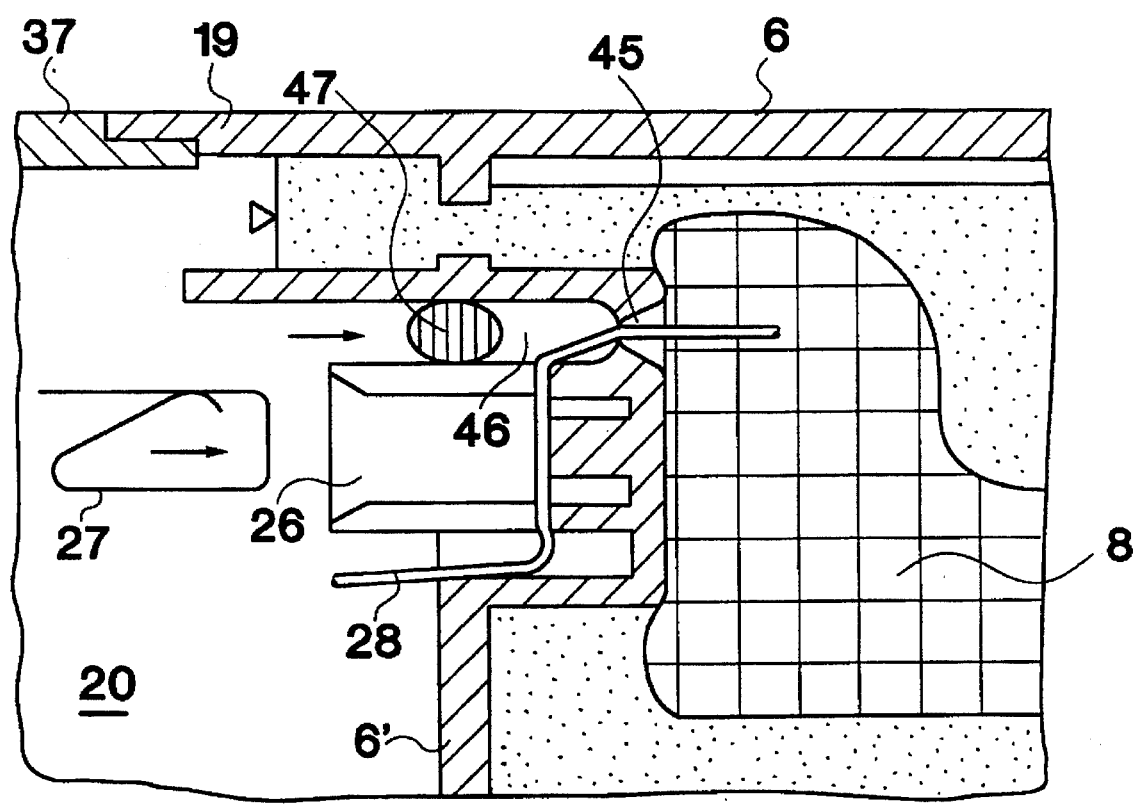
FIG. 3 is an enlarged side elevational view, in section, of a portion of FIG. 1, with a contact element not yet set in its contact support and a packing body not yet completely inserted.

During casting of the stator in the housing 6 no boss can be formed in connection chamber 20. Compensating chambers 21 and 24 as well as casting chamber 44, into which opens casting opening 17, are of dimensions of sufficient magnitude, as shown in compensating chamber 24 in FIG. 3 to receive epoxy resin. Passage openings 45 for connecting lines 28, which pass through end panel 6' of the housing 6, open into a passage 46, as shown in FIG. 3. Passage 46 can be closed and sealed by an elastic packing body 47 in the form of a web or skein for connection chamber 20.

While a particular embodiment has been chosen to illustrate the invention, it will be understood by those skilled in the art that various changes and modifications can be made therein without departing from the scope of the invention as defined in the appended claims.

What is claimed is:

1. An apparatus for pumps, comprising:

a housing;

a stator having a winding cast in said housing by a hardenable sealing compound to form a composite body, said composite body having coupling means on a first side thereof for attaching said composite body to a pump on said first side of said composite body and having a second side opposite said first side;

unblocking means on said second side of said composite body;

a connection chamber connected to a housing second end panel on said second side of said composite body and receiving electrical connection elements connecting electrical lines to said winding, said electrical lines extending in an axial direction of said composite body into said connection chamber; and a cover attached to said composite body and closing said connection chamber on said second side.

2. An apparatus according to claim 1 wherein
   said housing end panel comprises a central opening and at least one casting opening and at least one compensating opening therein, said casting opening and said compensating opening being spaced at radial distances from said central opening.

3. An apparatus according to claim 2 wherein
   said casting opening and said compensating opening open into a casting chamber and a compensating chamber, respectively, in said composite body, said casting chamber and said compensating chamber being defined by a wall projecting outwardly from said housing end panel and into said connection chamber.

4. An apparatus according to claim 3 wherein
   said cover is cylindrical, is axially spaced from said housing end panel, and forms at least a part of an outside limiting wall of said connection chamber.

5. An apparatus according to claim 1 wherein
   said housing end panel comprises discharge openings receiving said electrical lines and opening into a passage which is only open to said connection chamber;
   said passage receives a packing body sealing said connection chamber.

6. An apparatus according to claim 1 wherein
   said housing end panel comprises at least one contact support for mounting said electrical connection elements, said contact support being unitarily formed with said housing end panel.

7. An apparatus according to claim 6 wherein
   said housing end panel, on a outside surface thereof, comprises holder elements for structural elements arranged in said connection chamber.

8. An apparatus according to claim 1 wherein
   said housing end panel comprises a central opening with a pipe projecting therefrom into said connection chamber;
   said pipe engages a part of a bearing support for a second side bearing, said second side bearing receiving a rotating shaft;
   said part of said bearing support receiving said unblocking means, said unblocking means including a central threaded bore passing through said part of said bearing support and a threaded blanking plug received in said central threaded bore.

9. An apparatus according to claim 8 wherein
   said cover comprises a central connecting piece overlapping a free end of said pipe.

10. An apparatus according to claim 8 wherein said bearing support comprises a shoulder facing an interior surface of said housing end panel and a flange part axially spaced from said housing end panel;

an annular disk-shaped material part of said sealing compound is located between said flange part and said housing end panel and is attached to a hollow cylindrical material part of said sealing compound having an inner diameter substantially equal to a corresponding diameter of said stator, said flange part of said bearing support engaging said disk-shaped material part;

said flange part comprises an annular groove opening radially outwardly and axially toward said disk-shaped part, said annular groove receiving an O-ring;

a split tube is mounted in and engages said hollow cylindrical material part, said split tube comprises a radially inwardly inclined flange engaging said disk-shaped material part, said inclined flange having radial dimension smaller than a corresponding radial dimension of said annular groove; and screws pass through said housing end panel and said disk-shaped material part, and engage threaded bores in said bearing support.

11. An apparatus according to claim 10 wherein said flange part is centered and mounted in said split tube.

12. An apparatus according to claim 10 wherein one of said screws is connected to a conductor at ground potential.

13. An apparatus according to claim 10 wherein said housing comprises a first end panel forming a contact surface for a flat packing disk, said flat packing disk having an outside border clamped between said housing second end panel and a pump housing and having an inside border clamped between said housing second end panel and a radially outwardly extending flange on said split tube.

* * * * *